Dec. 17, 1929.    G. C. FEDDERMAN    1,739,827
HOLD DOWN DEVICE FOR AUTOMOBILES
Filed May 6, 1924
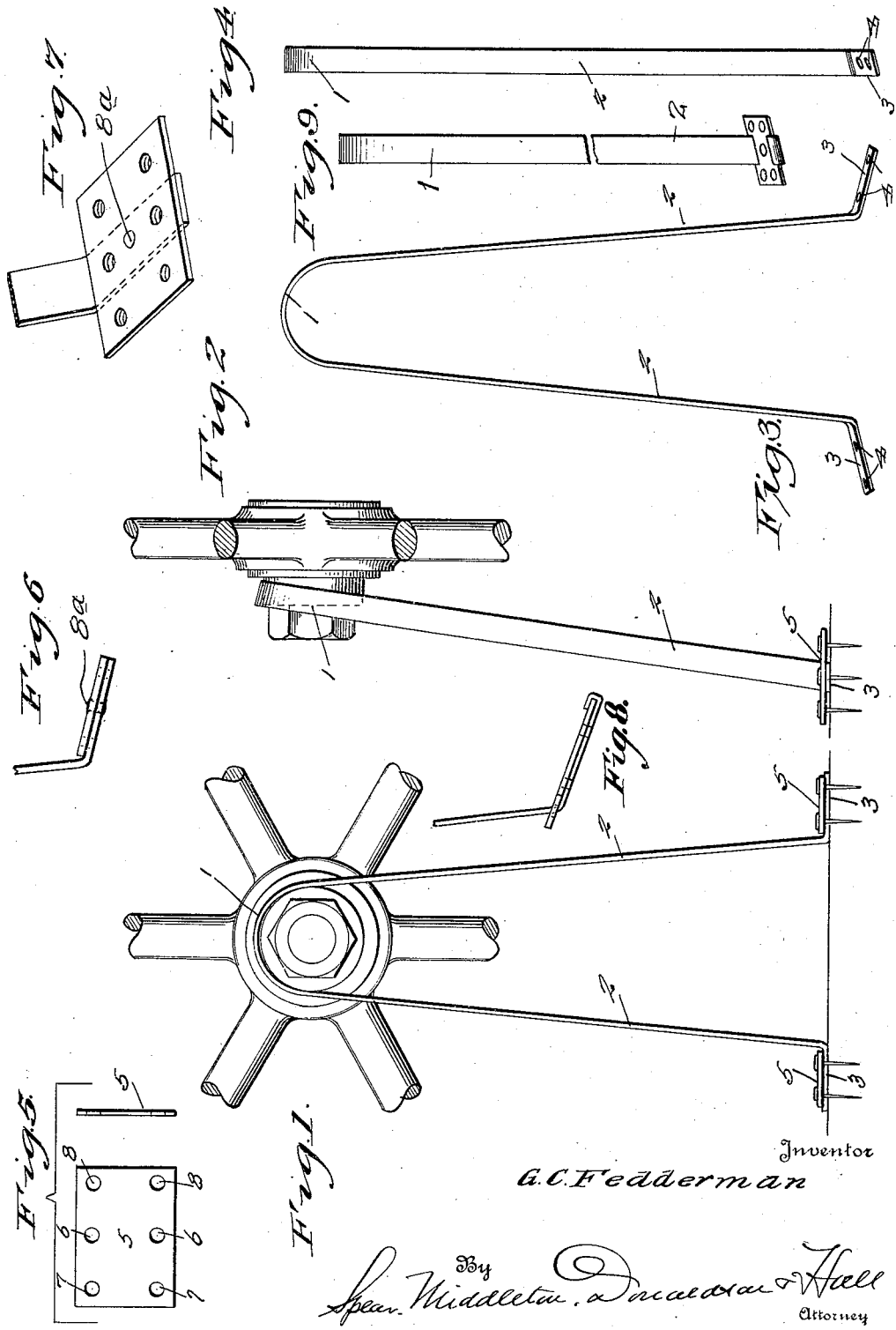

Patented Dec. 17, 1929

1,739,827

UNITED STATES PATENT OFFICE

GEORGE C. FEDDERMAN, OF DETROIT, MICHIGAN, ASSIGNOR TO AUTO LOADING DEVICE MANUFACTURING COMPANY, OF DETROIT, MICHIGAN, A CORPORATION OF MICHIGAN

HOLD-DOWN DEVICE FOR AUTOMOBILES

Application filed May 6, 1924. Serial No. 711,451.

The invention is an improvement in hold down devices for use in shipping automobiles.

Devices of this general character are intended to be used for holding an automobile to the floor of a freight car, against vertical movement, chock blocks being ordinarily employed for preventing displacement horizontally, and these hold down devices are to be employed in connection with or without the chock blocks.

In the accompanying drawings:

Figure 1 is a front view of part of the wheel of an automobile with my improvement in place and nailed to the floor.

Fig. 2 is a side view of Fig. 1.

Fig. 3 is a view of the hold down device before being applied to the car.

Fig. 4 is a view a quarter turn from Fig. 3.

Fig. 5 is a view of a detail.

Figs. 6 and 7 are views of a foot plate attached to the device.

Fig. 8 is a modified form of holding plate.

Fig. 9 is a side view of the strap partly broken away with the foot plate of Fig. 8 attached thereto.

The hold down device 1 is formed from strap metal and is of partial loop form with the sides 2 divergent downwardly. At the lower end of the side portions or legs are foot portions 3 which are formed by bending the strap metal in two directions, as shown in Figs. 3 and 4. One bend takes place in the vertical plane which is common to and cuts the two sides forming the main body of the strap, but at an acute angle to a horizontal plane so that these feet project from the lower ends of the sides downwardly at an angle, and outwardly, one foot extending in one direction and the other in the opposite direction. This disposition of the foot portions is best shown in Fig. 3. The foot portions are also inclined laterally in respect to the vertical plane passing through the sides or legs of the strap, and this is shown in Fig. 4 where it will be noticed that the foot portion is at an angle to the horizontal in a direction laterally of the strap. In placing the strap in connection with the hub of the automobile, it is placed in inclined position as shown in Fig. 2, embracing the hub or outer part of the car, and this inclined position is such as to make the laterally inclined foot as viewed in Fig. 4 bear upon the car floor throughout the transverse extent of the lower or end edge of the foot. A nail is then driven through that one of the holes 4 which lies nearest the end of the foot, and then the second nail is driven, and the hole for this is the one nearest the main side portion of the strap. The driving of this second nail will bend the foot into right angular relation with the main body, take up any looseness in the fitting of the strap about the hub, or other part with which it engages, and the foot portion will then rest throughout its extent upon the floor. At the same time the strap as a whole will be inclined as shown in Fig. 2.

The strap, therefore, leans towards the wheel. This form of strap can be used on cars having smooth hub caps and in case a tire becomes deflated the strap will not slip off the hub, but will naturally lean towards the wheel and will remain overlying the hub so that vertical movement will be resisted when the hub of the deflated wheel rises under shock or jar due to the uneven roadbed.

A foot plate 5 is employed in fastening the foot of the strap to the floor. This plate has a central pair of openings 6 corresponding in position to the openings through the foot plate and a pair of openings 7, and a pair 8 at the ends of the plate.

The plate is placed across the foot of the strap and nails are driven through the central pair of holes and through the holes of the foot portion and other nails are driven through openings in the end of the plate.

As shown in Figs. 6 and 7 the reinforcing foot plate may be secured to the bent lower end of the hold-down. In attaching the plate it is riveted thereto as at 8$^a$, the plate being on the upper side of the foot of the loop member, so that the full holding power of the plate will be effective, or the plate and foot may be attached by passing the foot through an opening in the plate to lie along its under side and with its end turned up and over the edge of the plate as in Fig. 8.

If, however, it were used to engage the axle or the spring, the lateral inclination of the foot portion would not be necessary, but only the longitudinal inclination would be used, that is, the inclination of the foot in the plane of the body of the strap. In other words, the strap would not have to be inclined as shown in Fig. 2 to the wheel or hub.

I do not limit myself to the exact form of the metal loop nor to the exact cross sectional shape of the metal thereof.

I claim:

1. A hold down for automobiles consisting of a metal strap bent to partial loop form, and having sides and foot portions, the latter extending downwardly and outwardly at an inclination to said sides and in the plane passing through the two sides of the loop longitudinally, said foot portions extending also in planes inclined transversely to the first mentioned plane, substantially as described.

2. A hold down having metal sides and foot portions extending downwardly at an inclination to said sides to rest initially at their extreme outer ends and provided with openings at different distances from the ends of said foot portions whereby the driving of a nail at the greater distance from the end of the foot portion after a first nail is driven will take up any slack in the hold down relative to the part engaged thereby, substantially as described.

3. In combination a hold down device consisting of a strap of metal of partial loop form, and having foot portions extending to one side of the main body of the strap, and inclining downwardly and outwardly to rest initially only on their outer ends, and means for securing the said foot portions to the floor said means deforming said foot portions to rest on the floor, substantially throughout their length, and taking up slack in the hold down relative to the part held thereby substantially as described.

4. In combination, a hold down device consisting of a metallic member of partial loop form, having side legs with feet portions bent to one side, and inclining downwardly, and outwardly to rest initially only upon their extreme outer ends and adapted to receive nails at different distances from the end of the foot portion, whereby the driving of a second nail more distant from the end of the foot than the first nail will tighten the hold down and take up slack, substantially as described.

5. In combination, a hold down device consisting of a metallic member of partial loop form, having side legs with feet portions bent to one side, and inclining downwardly and outwardly to rest initially only upon their extreme outer ends, and adapted to receive nails at different distances from the end of the foot portion, whereby the driving of a second nail more distant from the end of the foot than the first nail will tighten the hold down and take up slack, and a plate overlying the foot portion and extending laterally beyond said foot portion, said plate having nail openings at different distances from the end of the foot portion to receive the nails passing through the plate, and to receive other nails through its laterally extending portions, substantially as described.

In testimony whereof, I affix my signature.

GEORGE C. FEDDERMAN.